(12) United States Patent
Turatti

(10) Patent No.: US 7,475,629 B2
(45) Date of Patent: Jan. 13, 2009

(54) APPARATUS FOR COOKING FOODS

(75) Inventor: Antonio Turatti, Cavarzere (IT)

(73) Assignee: Turatti S.r.l., Cavarzere (VE) (IT)

( * ) Notice: Subject to any disclaimer, the term of this patent is extended or adjusted under 35 U.S.C. 154(b) by 240 days.

(21) Appl. No.: 11/438,328

(22) Filed: May 23, 2006

(65) Prior Publication Data

US 2006/0278096 A1    Dec. 14, 2006

(30) Foreign Application Priority Data

May 27, 2005    (IT)    ......................... RM2005A0267

(51) Int. Cl.
*A23L 1/00*    (2006.01)
(52) U.S. Cl. .............................. 99/330; 99/348; 99/409

(58) Field of Classification Search ........... 99/327–333, 99/352–355, 348, 444–450, 467–479, 483, 99/403–418; 426/523
See application file for complete search history.

(56) References Cited

U.S. PATENT DOCUMENTS

| | | | | |
|---|---|---|---|---|
| 3,870,193 A | * | 3/1975 | Schneider | 221/150 A |
| 4,236,541 A | * | 12/1980 | Cipriani | 134/104.3 |
| 5,201,265 A | * | 4/1993 | Matsui | 99/476 |
| 5,947,015 A | * | 9/1999 | Laurbak | 99/535 |

FOREIGN PATENT DOCUMENTS

EP    1726241 A2 *    11/2006

* cited by examiner

*Primary Examiner*—Timothy F. Simone
(74) *Attorney, Agent, or Firm*—Young & Thompson

(57) ABSTRACT

An apparatus (1) for cooking foods, includes a support frame (3), a container (2) for food to be cooked, provided with a door (6) for introduction and withdrawal of the foods, and heating fluid supply elements, characterised in that the container is rotatably mounted on a fixed axis (4) of the frame (3); and in that it includes a motor rotating the container (2), foods contained within the container (2) being cooked by the heating fluid during rotation of the container (2).

29 Claims, 3 Drawing Sheets

APPARATUS FOR COOKING FOODS

FIELD OF THE INVENTION

The present invention relates to an apparatus for cooking foods.

More specifically, the invention concerns an apparatus for cooking various kinds of foods, permitting a batch cooking, i.e. with differentiated loading and unloading cycles, and the possibility of making different kind of cookings.

DESCRIPTION OF THE RELATED ART

As it is well known, at present, cooking or pre-cooking of various foods, either animal, vegetable, or mixed foods, is carried out within apparatuses providing fixed containers. Said containers are provided with an opening on the upper surface for introduction of food to be cooked and with a lower opening for extraction of cooked or pre-cooked food.

Said container provides a rotating element passing through its axis. Said element permits a mixing of foods and ingredients.

This causes a continuous damaging of foods, deteriorated by gears and rotating elements.

Furthermore, cooking devices already known do not permit differentiated cookings, or loading and unloading of food at different times or during different cooking steps. In other words, apparatuses are not available permitting various cooking, such as pressure-cooking, vapour cooking and vacuum cooking. If it is desired to cook a food in two different ways, it is today necessary for the food to pass from a first to a second cooking apparatus.

Therefore it is object of the present invention that of providing an apparatus permitting avoiding damage to food during its cooking.

Another object of the present invention is that said apparatus permits different ways of cooking.

Still another object of the present invention is that of permitting adding ingredients during different cooking steps, along with dressings.

It is therefore a specific object of the present invention an apparatus for cooking foods, comprising a support frame, a container for food to be cooked provided with a door for introduction and withdrawal of said foods, and heating fluid supply means, characterised in that said container is rotatably mounted on a fixed axis of said frame; and in that it comprises a motor rotating said container, and foods contained within said container are cooked by said heating fluid during rotation of said container.

Always according to the invention, walls of said container can be comprised of an outer skirt, an inner skirt, a space between said outer and inner skirts, and a cooking chamber.

Still according to the invention, said heating fluid can be passed through said cooking chamber and/or said space.

Furthermore, according to the invention, said supply means can comprise a valve for introduction of heating fluid within said space and/or within said cooking chamber, and at least a discharge valve connected with a suction system.

Further, according to the invention, said apparatus can comprise means for regulating cooking, comprising a programmable logic unit, a thermometer and/or pressure measuring means.

Always according to the invention, cooking of said elements can occur by supplying heating fluid on the outer skirt at atmospheric pressure, or by supplying heating fluid on the outer skirt with a pressure higher than atmospheric pressure, or by regulation of heating fluid temperature on the outer skirt and continuous injection of heating fluid within said cooking chamber, or by supplying heating fluid on the outer skirt under vacuum.

Furthermore, according to the invention, said fixed axis can be a horizontal axis.

Advantageously, according to the invention, said apparatus can comprise an automatic actuating device for introduction and withdrawal of said foods within said container through said door, said automatic actuating device being of the pneumatic and/or oleodynamic and/or electric and/or mechanical kind.

Preferably, according to the invention, said foods can be loaded from above and discharged from the bottom.

Always according to the invention, said apparatus can comprise mixing blades for permitting a uniform cooking of said foods, and scraping elements Still according to the invention, said apparatus can comprise condensate collection means, that can comprise a collection torus and an outlet conduct.

Furthermore, according to the invention, said door can provide mechanical safety devices.

Preferably, according to the invention, said door can be comprised of a ball valve, or any other suitable sealing device.

Advantageously, according to the invention, said door can comprise a control device connected with a pressostati.

Always according to the invention, said apparatus can comprise a device for injection of aromas.

Still according to the invention, said apparatus can comprise a pipe union for recovering washing water and a device for recovering cooked food aromas.

Preferably, according to the invention, said heating fluid can be vapour.

BRIEF DESCRIPTION OF THE SEVERAL VIEWS OF THE DRAWINGS

The present invention will be now described, for illustrative but not limitative purposes, according to its preferred embodiments, with particular reference to the figures of the enclosed drawings, wherein.

DETAILED DESCRIPTION OF THE PREFERRED EMBODIMENTS

Figure 1:
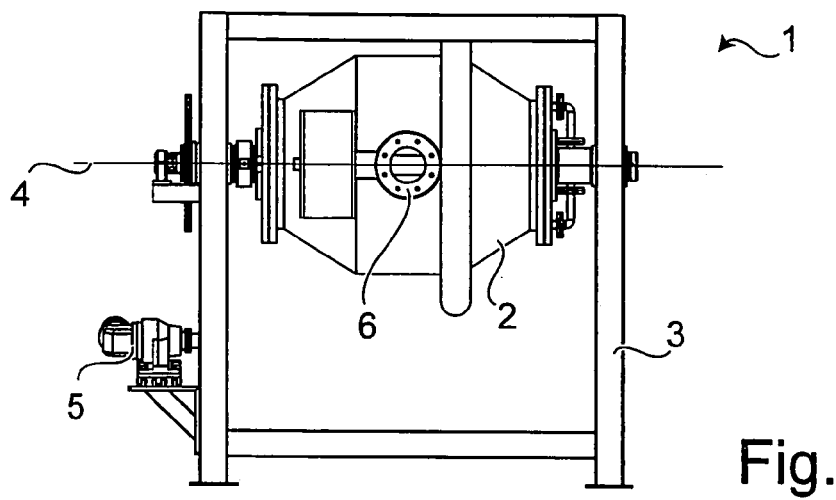
FIG. 1 is a side view of apparatus for cooking food according to the present invention.
Figure 2:
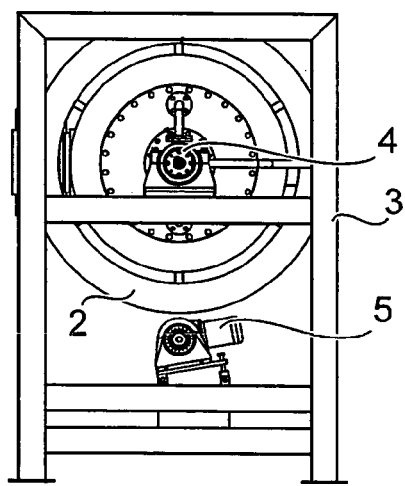
FIG. 2 is a front section view of apparatus of FIG. 1.
Figure 3:
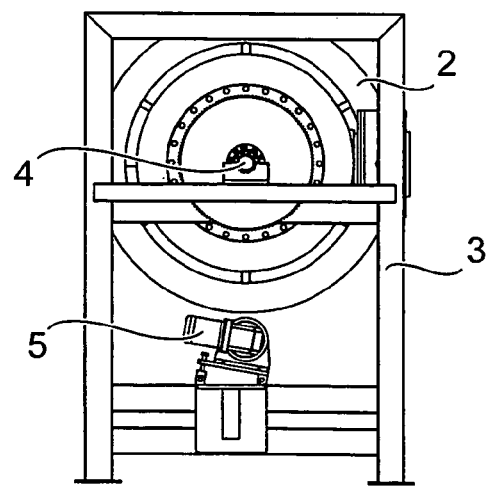
FIG. 3 shows a rear view of apparatus of FIG. 1.

Making reference to FIGS. 1, 2 and 3, it is possible noting apparatus 1 according to the present invention.

Apparatus 1 comprises a container 2 for foods to be cooked, mounted on a support frame 3 so as to rotate about a horizontal axis 4. said frame is preferably comprised of stainless steel. It is also provided a motor 5 for permitting rotation of container 2.

Container 2 provides a door for introduction of food to be cooked.

Figure 4:
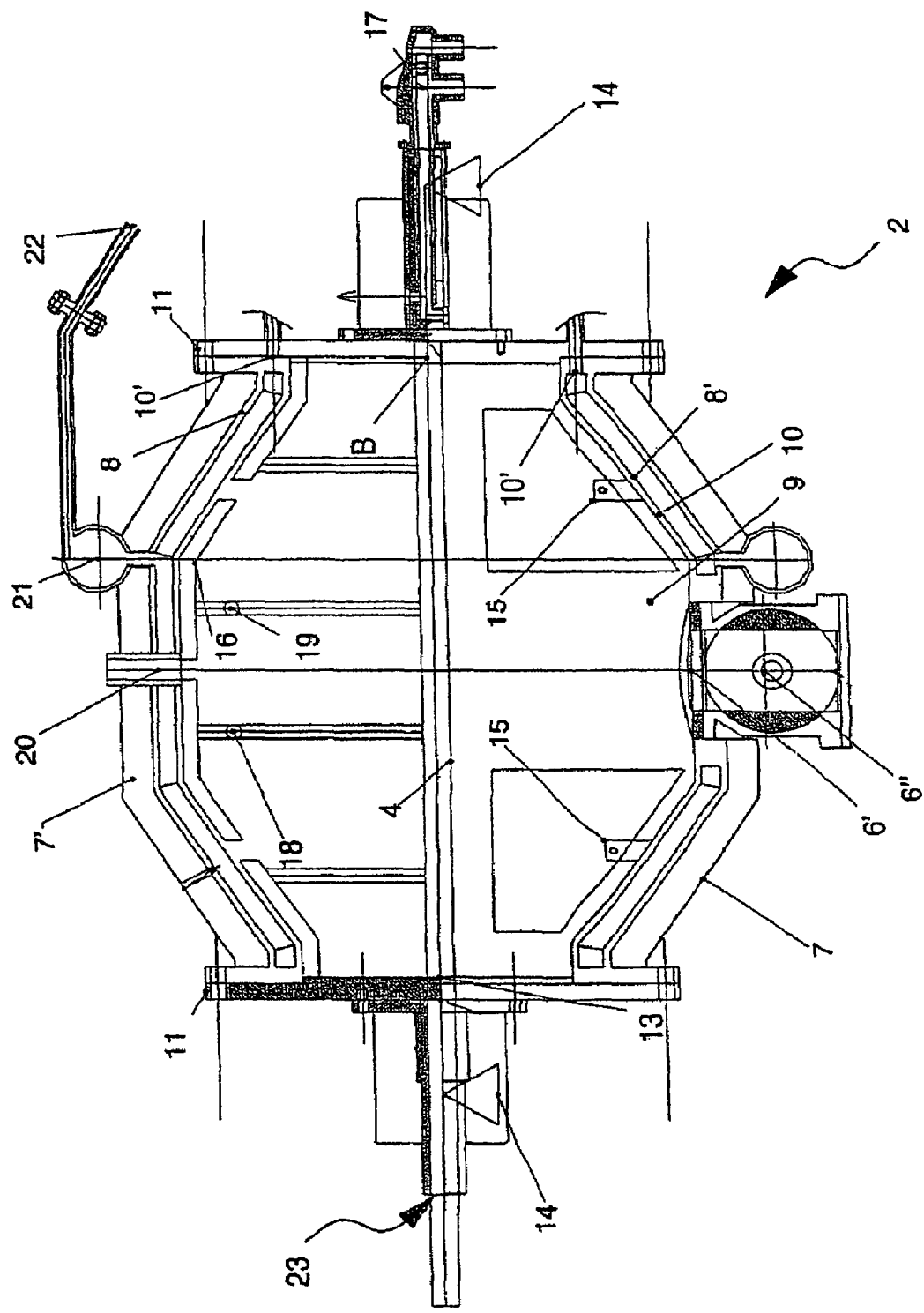
FIG. 4 shows a side section view of a container for cooking foods.

Examining in greater detail operation and structure of container 2, making reference to FIG. 4, it can be noted that product to be cooked is introduced (from above) and removed (from the bottom) through opening 6', closed by the sealed door 6 and operated automatically. Said door 6 is also provided with safety/mechanical sealing devices. Furthermore, it is connected with an activation system connected with a pressure switch (not shown in the figure), in order to avoid outlet of vapour during opening. A pneumatic actuator 6" is further present on door 6, and said container 2 provides an outer coating 7, under which an insulation 7' is provided in order to prevent thermal dispersion.

Apparatus 1 can operate also according to a batch mode, i.e. with loading and unloading cycles. Rotating about horizontal axis 4, it is possible to cook by pressurised heating fluid both on an outer skirt 8 and directly inside cooking chamber 9.

Rotating container 2, skirt 8 rotates with respect to axis 4, permitting also working of delicate products. This permits avoiding or drastically reducing damaging of food. Also, the shape of the container, which is preferably frusto-conical, permits a delicate treatment of the products.

Heating during cooking occurs either on the outer skirt 8 (indirect heating) or within the cooking chamber 9 (direct heating).

Container 2 is provided with a space 10, under which an inner skirt 8' is provided, within which calorific fluid (typically vapour) is injected and from which condensate is withdrawn, as will be explained in the following. Supply of calorific fluid occurs through conduct (or series conducts) 10'.

Closure flanges 11 are provided on the ends of container 2, between said container and the rotation axis 4. said flanges 11 and said space 10 are coinbentante outward in order to reduce heat dispersion and protect sealing systems, bearings 13 and guide slide 14 on the fixed axis 4, permitting rotation of container 2.

As already said, container 2 is motorised and rotates for mixing food contained therein. Mixing is also obtained thanks to mixing blades 15. further, some scraping elements 16 are provided within container 2 in order to reduce at most adhesion of products on the inner surface of container 2.

Said scraping elements 16 can be of the mechanical kind or of the vapour blade kind or of the air pressure blade kind, or of any other kind.

A rotating distributor 17, preferably a three-way distributor, circulates calorific fluid within said container 2.

By said apparatus 1, it is possible recovering or discharging from product vapour or incondensable substances, through an automatic valve 32 (see FIG. 5) or holes inside the cooking apparatus 18, 19. This permits loosing cooking liquids, recovering aromas and improving organoleptic features of the cooked foods.

Recover of cooking vapour is carried out in order to determine level of cooking products.

Apparatus 1 is also pre-set for admission of aromas through an automatic valve 33 (see FIG. 5) through holes 18 or 19 inside said apparatus 1.

Inlet conduct 20 is possibly provided for recovering washing water.

Condensate produced during food cooking is recovered by collection torus 21 and conveyed by one or more conducts 22.

In order to avoid overheating of air and distributor, terminal part of shaft 23 placed along axis 4, and supports are cooled by circulation of heat exchange fluid.

Said apparatus 1 can cook both at atmospheric pressure and at a higher pressure in view of a cooking pressure and temperature regulation system. Particularly, cooking cycles that can be realised by said apparatus 1, are listed in the following, making also reference to FIG. 5:

indirect vapour cooking at atmospheric pressure: under these conditions, heating occurs by vapour supply only on the outer skirt 8. A thermometric probe 28 placed inside the cooking apparatus controls opening of a regulation valve 26. Discharge valve is always open;

pressure indirect vapour cooking: heating of product occurs by supplying heating fluid on the outer skirt 8. Temperature inside container 2 is regulated by valve of opening of vapour discharge 32 and pressure switch 29;

direct vapour cooking: direct vapour cooking is obtained regulating vapour temperature on outer skirt 8. Vapour is continuously injected inside container 2 by automatic valve 30. cooking temperature is regulated by opening or closure of vapour discharge valve 32;

vacuum indirect cooking: food cooking occurs by supplying vapor on the outer skirt 8. Decompression within container 2 is regulated by valve opening vapour discharge, connected with a suction system (not shown in the figures).

Figure 5:
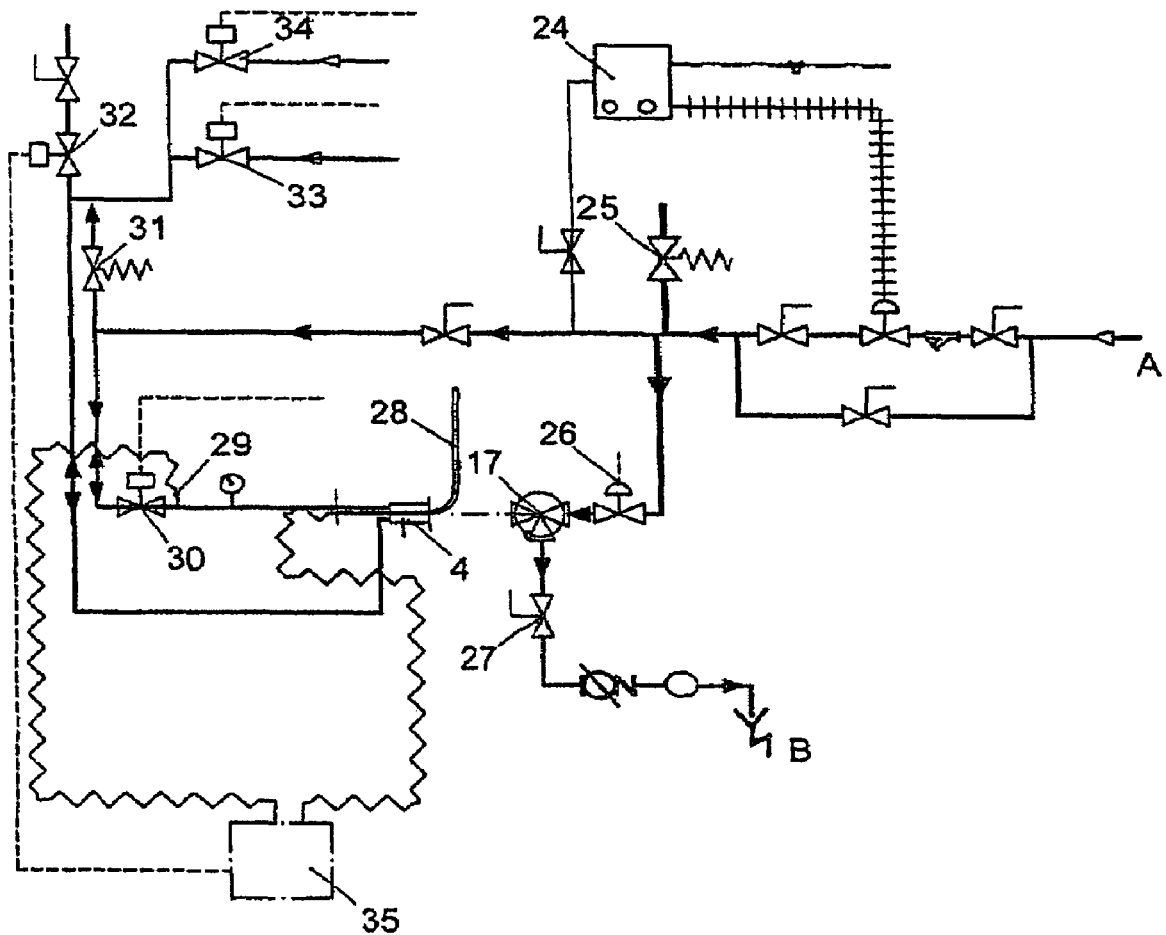
FIG. 5 shows a scheme of a supply system for heating fluid and regulation systems.

An embodiment of a scheme of a regulation system is shown in FIG. 5. Particularly, thermal fluid enters according to direction A and exits according to direction B, It is possible observing a group for reduction of pressure of thermal fluid 24 and a safety valve 25.

Valve 26 is provided for regulation of cooking temperature, with direct injection on the outer skirt 8 of container 2.

Outlet of thermal fluid from skirt 8 according to direction B by valve 27 is connected with three-way rotating distributor 17.

Said supply system provides thermal 28 and pressure 29 probes, for detection temperature and inner pressure of container 2, respectively.

Valve 30 permits regulating temperature for injection of vapour within container 2. a further safety valve 31 is connected with vapour direct supply circuit.

Valve 32 permits withdrawing vapour from container 2. Valves 33 and 34 regulate introduction of aromas and washing water.

A programmable logic unit 35 obtains valve coordination.

Finally, apparatus can be also provided with an automatic opening permitting supply and discharge of food to be cooked.

On the basis of the previous specification, it can be observed that the basic feature of the present invention is that it permits a uniform cooking of foods without damaging foods, and permits a plurality of different cooking cycles.

A first advantage of the present invention is that said apparatus permits cooking different foods, either animal, vegetable or mixed foods.

A second advantage of the present invention is that of providing an inner mixer permitting a uniform cooking of the food product.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. An apparatus for cooking foods, the apparatus comprising:
    a support frame;
    a container for food to be cooked, mounted on said frame and provided with a door for introduction and withdrawal of foods;
    a motor configured to rotate said container; and
    heating fluid supply means,
    wherein said container is rotatably mounted on a fixed axis of said frame, and wherein said foods are cooked within said container by said heating fluid supply means during operative rotation of said container.

2. The Apparatus according to claim 1, wherein walls of said container comprise an outer skirt, an inner skirt, a space between said outer and inner skirts, and a cooking chamber.

3. The Apparatus according to claim 2, wherein said heating fluid passes through any of said cooking chamber and said space.

4. The Apparatus according to claim 1, wherein said supply means comprise a valve for introduction of heating fluid within any of said space and said cooking chamber.

5. The Apparatus according to claim 1, wherein said supply means comprise at least a discharge valve connected with a suction system.

6. The Apparatus according to claim 1, further comprising: means for regulating cooking.

7. The Apparatus according to claim 6, wherein said regulation means comprise a programmable logic unit.

8. The Apparatus according to claim 6, wherein said regulation means comprise any of a thermometer and pressure measuring means.

9. The Apparatus according to claim 1, wherein cooking of said foods occurs by operatively supplying heating fluid on the outer skirt at atmospheric pressure.

10. The Apparatus according to claim 1, wherein cooking of said foods occurs by operatively supplying heating fluid on the outer skirt with a pressure higher than atmospheric pressure.

11. The Apparatus according to claim 1, wherein cooking of said foods occurs in operation by regulation of heating fluid temperature on the outer skirt and continuous injection of heating fluid within said cooking chamber.

12. The Apparatus according to claim 1, wherein cooking of said foods occurs by supplying heating fluid in operation on the outer skirt under vacuum.

13. The Apparatus according to claim 1, wherein said fixed axis is a horizontal axis.

14. The Apparatus according to claim 1, further comprising:
an automatic actuating device for introduction and withdrawal of said foods within said container through said door.

15. The Apparatus according to claim 14, wherein said automatic actuating device is any of a pneumatic device, an oleodynamic device, an electric device, and a mechanical device.

16. The Apparatus according to claim 1, wherein said container is configured such that foods are loaded from above said container and discharged from a bottom of said container.

17. The Apparatus according to claim 1, further comprising:
mixing blades in said container for permitting a uniform cooking of said foods.

18. The Apparatus according to claim 1, further comprising:
scraping elements in said container for cleaning an inner surface of said container.

19. The Apparatus according to claim 1, wherein said container comprises condensate collection means.

20. The Apparatus according to claim 1, wherein said container comprises a collection torus.

21. The Apparatus according to claim 1, wherein said container comprises an outlet conduct.

22. The Apparatus according to claim 1, wherein said door is provided with mechanical safety devices.

23. The Apparatus according to claim 1, wherein said door comprises a ball valve.

24. The Apparatus according to claim 1, wherein said door comprises a control device connected with a pressure switch.

25. The Apparatus according to claim 1, further comprising:
a device for injection of aromas.

26. The Apparatus according to claim 1, further comprising:
a pipe union for recovering washing water.

27. The Apparatus according to claim 1, further comprising:
a device for recovering cooked food aromas.

28. The Apparatus according to claim 1, wherein said heating Fluid is vapor.

29. The Apparatus according to claim 1, wherein said door comprises a sealing device.

* * * * *